United States Patent
Colaw et al.

(10) Patent No.: US 11,761,362 B2
(45) Date of Patent: Sep. 19, 2023

(54) SYSTEMS, DEVICES, AND METHODS FOR REGENERATING A PARTICULATE FILTER

(71) Applicant: JTSMCDP, LLC, Austin, TX (US)

(72) Inventors: Mark Colaw, Austin, TX (US); John Stiles, Austin, TX (US); David Philips, Austin, TX (US)

(73) Assignee: JTSMCDP, LLC, Austin, TX (US)

( * ) Notice: Subject to any disclaimer, the term of this patent is extended or adjusted under 35 U.S.C. 154(b) by 0 days.

(21) Appl. No.: 17/182,414

(22) Filed: Feb. 23, 2021

(65) Prior Publication Data
US 2021/0180490 A1 Jun. 17, 2021

Related U.S. Application Data

(62) Division of application No. 16/077,942, filed as application No. PCT/IB2017/051087 on Feb. 24, 2017, now Pat. No. 10,941,685.
(Continued)

(51) Int. Cl.
*F01N 3/025* (2006.01)
*F01N 9/00* (2006.01)
(Continued)

(52) U.S. Cl.
CPC ........... *F01N 3/0256* (2013.01); *F01N 9/002* (2013.01); *F01N 3/023* (2013.01); *F01N 3/025* (2013.01); *F01N 3/0253* (2013.01); *F01N 3/36* (2013.01); *F01N 9/005* (2013.01); *F01N 11/002* (2013.01); *F01N 13/087* (2013.01); *F01N 13/18* (2013.01); *F01N 2250/06* (2013.01); *F01N 2410/04* (2013.01); *F01N 2410/14* (2013.01);
(Continued)

(58) Field of Classification Search
CPC combination set(s) only.
See application file for complete search history.

(56) References Cited

U.S. PATENT DOCUMENTS 7,032,376 B1 4/2006 Webb
7,621,121 B2 11/2009 Acke et al.
(Continued)

FOREIGN PATENT DOCUMENTS

CN 103603714 2/2014
DE 102004049048 4/2006
(Continued)

OTHER PUBLICATIONS

International Search Report and Written Opinion issued in International Patent Application No. PCT/IB17/51087, dated Aug. 28, 2017.
(Continued)

*Primary Examiner* — Binh Q Tran
(74) *Attorney, Agent, or Firm* — Norton Rose Fulbright US LLP

(57) ABSTRACT

Embodiments described herein methods can be used in particulate filter regeneration, such as particulate filters used for filtering the exhaust of an engine, e.g., a diesel engine. Systems herein can be configured to dispense combustion gas(es) into housing were a particulate filter is contained and to ignite the combustion gases. Methods for conducting a safety verification process of such systems are disclosed, as well as methods for regenerating the filters. Still other embodiments are described.

19 Claims, 10 Drawing Sheets

Related U.S. Application Data

(60) Provisional application No. 62/299,303, filed on Feb. 24, 2016.

(51) Int. Cl.

| | |
|---|---|
| *F01N 3/36* | (2006.01) |
| *F01N 3/023* | (2006.01) |
| *F01N 11/00* | (2006.01) |
| *F01N 13/08* | (2010.01) |
| *F01N 13/18* | (2010.01) |
| *F02D 41/02* | (2006.01) |

(52) U.S. Cl.
CPC ...... *F01N 2430/06* (2013.01); *F01N 2550/04* (2013.01); *F01N 2550/12* (2013.01); *F01N 2560/06* (2013.01); *F01N 2610/03* (2013.01); *F01N 2610/14* (2013.01); *F01N 2610/1406* (2013.01); *F01N 2610/146* (2013.01); *F01N 2610/1453* (2013.01); *F01N 2900/0404* (2013.01); *F01N 2900/1806* (2013.01); *F01N 2900/1808* (2013.01); *F01N 2900/1821* (2013.01); *F02D 41/029* (2013.01); *F02D 2200/0812* (2013.01)

(56) References Cited

U.S. PATENT DOCUMENTS

| | | | | |
|---|---|---|---|---|
| 7,685,811 | B2* | 3/2010 | Taylor, III | .............. 60/303 |
| 8,850,800 | B2 | 10/2014 | Charles | |
| 9,958,158 | B2 | 5/2018 | McKnight | |
| 10,443,466 | B2* | 10/2019 | Yang | ............. F01N 3/2066 |
| 2005/0150218 | A1 | 7/2005 | Crawley | |
| 2006/0101810 | A1 | 5/2006 | Angelo | |
| 2009/0035195 | A1* | 2/2009 | Robel | ............. F01N 13/0097 |
| | | | | 422/177 |
| 2010/0319330 | A1 | 12/2010 | Hong | |
| 2012/0210982 | A1* | 8/2012 | Reba | ............. F01N 3/2066 |
| | | | | 29/888.011 |
| 2013/0227934 | A1 | 9/2013 | Zagone et al. | |
| 2013/0298530 | A1 | 11/2013 | Carlill et al. | |
| 2013/0343959 | A1* | 12/2013 | Golin | ............. F01N 3/2066 |
| | | | | 422/310 |
| 2015/0040542 | A1 | 2/2015 | Mitsuda et al. | |
| 2015/0101315 | A1 | 4/2015 | Ovrebo et al. | |
| 2015/0132188 | A1 | 5/2015 | Howard | |
| 2015/0176463 | A1 | 6/2015 | Olivier et al. | |
| 2015/0361858 | A1* | 12/2015 | Matsuo | ............. F01N 3/2066 |
| | | | | 60/303 |
| 2016/0214732 | A1* | 7/2016 | Vigliotta | ............. B64D 37/32 |
| 2017/0087515 | A1* | 3/2017 | Huang | ............. B01D 53/9495 |

FOREIGN PATENT DOCUMENTS

| | | |
|---|---|---|
| DE | 1020081035893 | 2/2010 |
| KR | 20110022862 | 3/2011 |
| KR | 20140025678 | 3/2014 |

OTHER PUBLICATIONS

Invitation to Pay Additional Fees issued in International Patent Application No. PCT/IB17/51087, dated Jun. 7, 2017.

Pidgeon, "An experimental investigation into the effects of biodiesel blends on particulate matter oxidation in a catalyzed particulate filter during active regeneration," Michigan Technological University, a dissertation, 2013. Retrieved from the Internet on Jun. 30, 2017 < URL: http///digitalcommons.mtu.edu/cgi/viewcontent/cgti?article=1482&context-etds >.

* cited by examiner

SYSTEMS, DEVICES, AND METHODS FOR REGENERATING A PARTICULATE FILTER

CROSS REFERENCE TO RELATED APPLICATIONS

This application is a divisional of U.S. patent application Ser. No. 16/077,942, filed Aug. 14, 2018, which is a national phase application under 35 U.S.C. § 371 of International Application No. PCT/IB2017/051087, filed Feb. 24, 2017, which claims the benefit of priority of U.S. Provisional Patent Application No. 62/299,303 filed Feb. 24, 2016, each of which is hereby incorporated herein by reference in its entirety.

BACKGROUND OF THE INVENTION

1. Field of Invention

The present invention relates generally to devices, systems, and methods for use in particulate filter regeneration.

2. Description of Related Art

Provided by way of example, typical particulate filters are installed in vehicles with diesel engines. Particulate filters require a regeneration process that cleans the filter by incinerating the soot particles that are trapped by the filter. The majority of driving conditions cause fluctuations in load that will not allow the regeneration system to regenerate the filter to a sufficient degree, causing poor performance and in extreme cases, engine shutdown. Reduced exhaust gas temperatures are the main cause of particulate filters with high soot accumulation. Oxidized NO2 regeneration requires exhaust gas temperatures of a minimum of 220 C to generate extremely small amounts of NO2 and thermal regeneration requires exhaust gas temperatures of a minimum of 450 C to regenerate. Particulate filter location also aggravates temperature losses due to the long exhaust pipe length between the engine and the particulate filter.

SUMMARY OF THE INVENTION

In view of the above-described issues, it is an object of the present disclosure to provide an auxiliary standalone particulate filter regeneration system independent from the vehicles onboard system, and a particulate filter regeneration method capable of raising an exhaust temperature to regenerate a particulate filter by combusting a fuel in the exhaust with the standalone device, where the temperature threshold is sufficient enough to oxidize the particulates accumulated in the filter.

An embodiment can include a method for regenerating a particulate filter. A method can comprise: coupling one or more supply lines, each line defining a conduit, to an engine exhaust pipe through at least one of one or more access ports disposed either upstream or downstream of a particulate filter, wherein each supply line is configured to be releasably coupled to the one or more access ports; dispensing a fuel through the one or more supply lines and into the exhaust pipe; and igniting the fuel thereby regenerating the particulate filter. In some particular embodiments, the access port is upstream of the particulate filter.

Another embodiment can include a system for regenerating a particulate filter. A system can comprise: a first supply line and a second supply line, each supply line defining a conduit having a first end and a second end and each supply line configured to releasably couple to an exhaust pipe such that the conduit is in fluid communication with the exhaust pipe at the first end; the second end of the first supply line configured to couple to a first reservoir comprising fuel such that the first supply line conduit is in fluid communication with the first reservoir; the second end of the second supply line configured to couple to a second reservoir comprising oxygen such that the second supply line conduit is in fluid communication with the second reservoir; and a connector coupled to the first supply line and the second supply line near their first ends, the connector configured to couple with an access port of the exhaust pipe such that the conduits of the first and second supply lines are in fluid communication with the exhaust pipe.

Another embodiment can include a system for regenerating a particulate filter. A system can comprise: a first supply line and a second supply line, each supply line defining a conduit having a first end and a second end and each supply line configured to releasably couple to a particulate filter such that the conduit is in fluid communication with the particulate filter pipe at the first end; the second end of the first supply line configured to couple to a first reservoir comprising fuel such that the first supply line conduit is in fluid communication with the first reservoir; the second end of the second supply line configured to couple to a second reservoir comprising oxygen such that the second supply line conduit is in fluid communication with the second reservoir; and a connector coupled to the first supply line and the second supply line near their first ends, the connector configured to couple either directly or indirectly with the particulate filter such that the conduits of the first and second supply lines are in fluid communication with the particulate filter. In some aspects of this embodiment, the system is configured to regenerate a particulate filter that has been removed from a vehicle. This embodiment of the system can be used, for example, in a method of regenerating a particulate filter comprising removing the particulate filter from a vehicle, connecting the particulate filter on the system, dispensing a fuel through the one or more supply lines and into the exhaust pipe; and igniting the fuel thereby regenerating the particulate filter. The particulate filter can then be replaced on the original vehicle or another vehicle.

Another embodiment can include an exhaust pipe fitting. A fitting can comprise a sidewall having a first end and a second end and defining at least a portion of a conduit extending between the first end and the second end, where the sidewall comprises an opening disposed between the first end and the second end that is in fluid communication with the conduit; the first end and the second end each configured to couple to an exhaust pipe or to a particulate filter housing such that the sidewall defines a portion of an engine exhaust path either upstream or downstream of the particulate filter housing. The fitting can further comprise a cover coupled to the sidewall, moveable between an open position and a closed position, and configured to cover the opening when in the closed position Yet another embodiment can include a method of testing a particulate filter regeneration system. Such method can comprise: opening a first valve downstream of a first fuel reservoir, a fuel pressure regulator, a second valve, and a pressure sensor disposed between the first valve and the second valve, where the first valve and the second valve each define a portion of a first conduit; closing the first valve; after closing the first valve, comparing the pressure between the first valve and the second valve to a first threshold value; if the pressure between the first valve and the second valve is below the threshold value, opening the second valve, closing the second valve, comparing the pressure between the first valve and the second valve to a second threshold value.

The term "coupled" is defined as connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the terms "substantially," "approximately," and "about" may be substituted with "within [a percentage] of" what is specified, where the percentage includes 0.1, 1, 5, and 10 percent.

Further, a device or system that is configured in a certain way is configured in at least that way, but it can also be configured in other ways than those specifically described.

The terms "comprise" (and any form of comprise, such as "comprises" and "comprising"), "have" (and any form of have, such as "has" and "having"), "include" (and any form of include, such as "includes" and "including") are open-ended linking verbs. As a result, an apparatus that "comprises," "has," or "includes" one or more elements possesses those one or more elements, but is not limited to possessing only those elements. Likewise, a method that "comprises," "has," or "includes," one or more steps possesses those one or more steps, but is not limited to possessing only those one or more steps.

Any embodiment of any of the apparatuses, systems, and methods can consist of or consist essentially of—rather than comprise/have/include—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb.

The feature or features of one embodiment may be applied to other embodiments, even though not described or illustrated, unless expressly prohibited by this disclosure or the nature of the embodiments.

Some details associated with the embodiments are described above, and others are described below.

BRIEF DESCRIPTION OF THE DRAWINGS

The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers. The figures are drawn to scale (unless otherwise noted), meaning the sizes of the depicted elements are accurate relative to each other for at least the embodiment depicted in the figures.

FIG. 8(*ii*) is a top view of the device of shown in FIG. 8(*ii*).

DETAILED DESCRIPTION OF THE DRAWINGS

Figure 1:
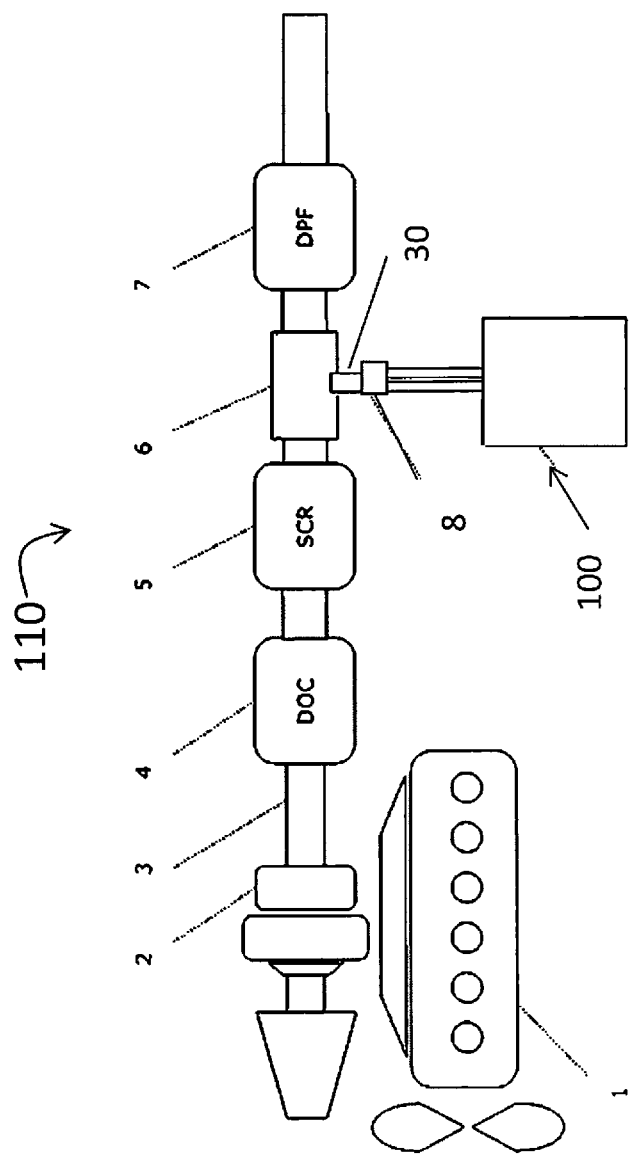
FIG. 1 is a block diagram of an exhaust system coupled with an embodiment in accordance with the present disclosure.

Referring now to the figures, and more particularly to FIG. 1, shown therein and designated by the reference numeral 100 is an embodiment of a particulate filter regeneration system that is shown coupled to an engine exhaust system 110. The engine exhaust system shown includes an exhaust pipe 3 that extends from an engine 1 (e.g., a diesel engine) through a turbo charger 2 and through various modules for removing pollutants from the exhaust gas. In the embodiment shown, a diesel oxidation catalyst (DOC) 4 is in fluid communication with the exhaust pipe 3 and is disposed on the downstream side of the turbo charger 2. Similarly, a selective catalytic reduction system (SCR) 5 is in fluid communication with the exhaust pipe 3 on the downstream side of the DOC 4, and a particulate filter 7 is in fluid communication with the exhaust pipe 3 and is disposed on the downstream side of the SCR 5. To facilitate cleaning of the particulate filter with a regeneration system 100, the exhaust system 110 comprises an adapter fitting 6 disposed on the downstream side of the SCR 5 and either the upstream or downstream side of the particulate filter 7. The adapter fitting 6 is shown coupled to a particulate filter regeneration system 100.

The regeneration system 100 comprises a first supply line 101 and a second supply line 102 configured to provide one or more fuels and, if needed, an oxidizer, to the exhaust pipe 3 either upstream or downstream of the particulate filter 7. The system 100 further comprises a connector 8 that is configured to couple with an access port 30 of the exhaust pipe 3 (such as at adapter fitting 6) such that the first and second supply lines 101, 102 are in fluid communication with the exhaust pipe 3. The connector 8 is configured to releasably couple with the access port of the exhaust pipe 3 so that the regeneration system 100 can be selectively coupled to and decoupled from the exhaust system, such as through a quick-release mechanism. The access port to the exhaust pipe 3 is located either upstream or downstream of a particulate filter 7 so that when the fuel fed to the exhaust pipe 3 is combusted, the soot or particulate matter on the particulate filter 7 is oxidized, e.g., converted to a harmless gas(es). With such system, the particulate filter can be selectively regenerated or cleaned.

Figure 2:
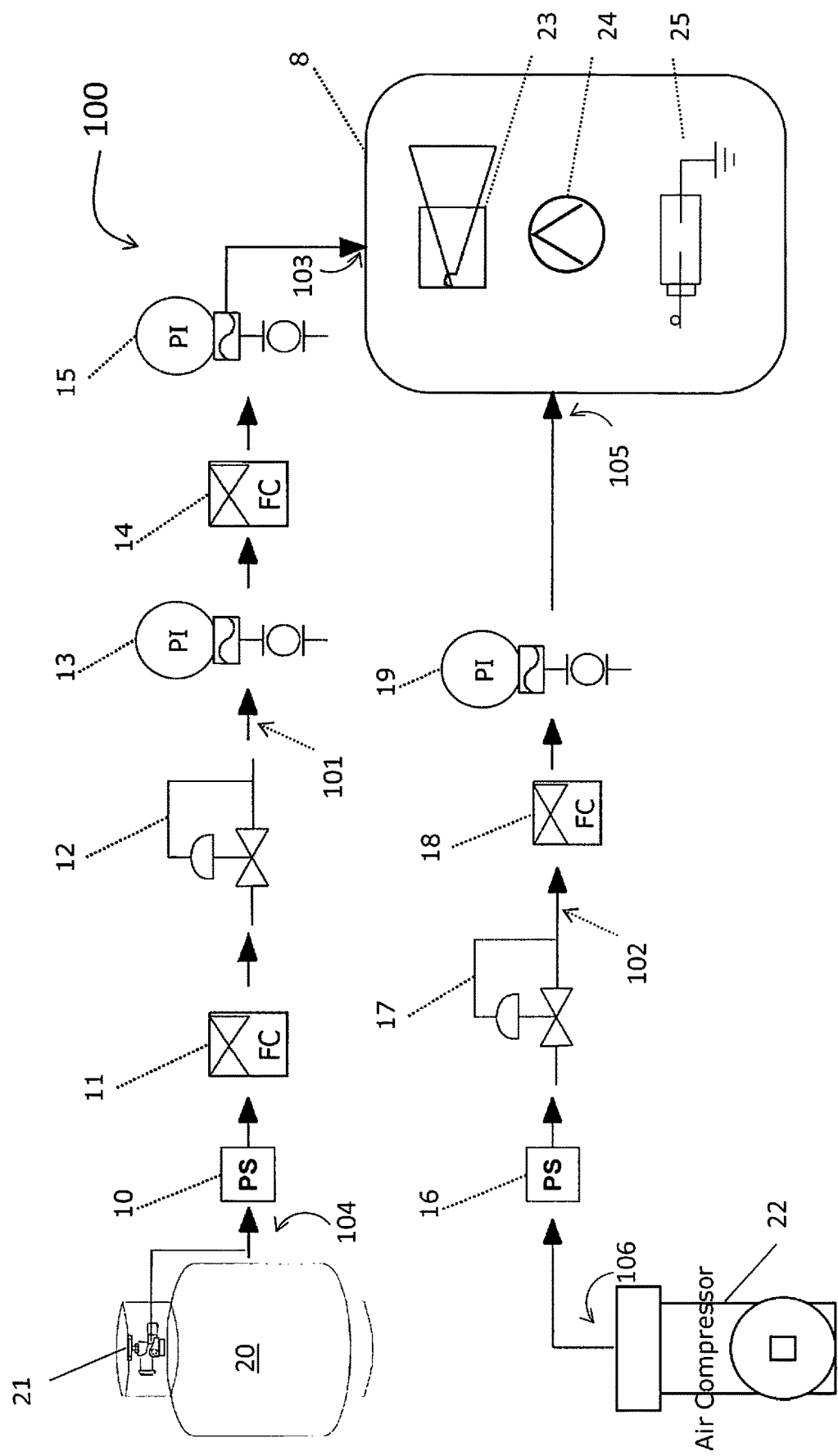
FIG. 2 is a block diagram of a regeneration system embodiment in accordance with the present disclosure.

Referring now to FIG. 2, a particulate filter regeneration system 100*a* is shown and is a more detailed schematic of the particulate filter regeneration system that is shown in FIG. 1. Regeneration system 100*a* comprises supply line 101 (which is shown coupled to a fuel reservoir 20 via valve 21) and supply line 102 (which is shown coupled to an oxidizer source 22). Each supply line 101, 102 can be coupled to a connector 8 that is configured to couple to the access port of an exhaust pipe 3 so that the supply lines 101, 102 are in fluid communication with the exhaust pipe 3.

Supply line 101 defines a conduit having a first end 103 and a second end 104 and is configured to transport fuel through the conduit. The supply line 101 is coupled to connector 8, and during use, e.g., when connector 8 is coupled to an access port of the exhaust pipe 3, the conduit is in fluid communication with the exhaust pipe 3 at the first end 103. Second end 104 is coupled to a fuel source, e.g., reservoir 20. Reservoir 20 can contain a fuel with a relatively low boiling point and high BTU content as compared to other fuel options. For example, in some embodiments, reservoir 20 can contain butane, propane, methane and/or any combination thereof.

Along the length of the supply line 101 are several modules for controlling flow and measuring pressure within the supply line 101. In the embodiment shown, a pressure switch 10 is disposed on the downstream side of reservoir 20. The pressure switch 10 can be configured to output a signal to indicate whether the reservoir valve is open and/or to indicate whether the pressure within the reservoir 20 is adequate. A fuel pressure regulator 12 is located on the downstream side of the pressure switch 10 and can be configured to reduce the pressure of the fuel flowing from reservoir 20 to a predetermined pressure. A fuel supply valve 11 is located on the upstream side of the fuel pressure regulator 12 and can be configured to block or permit flow through the supply line conduit 101. A pressure sensor 13 is disposed on the downstream side of the fuel supply valve 11 and can be configured to measure the pressure within the supply line 101. Another fuel supply valve 14 can be located on the downstream side of the pressure sensor 13, and another pressure sensor 15 is located downstream of the fuel supply valve 14.

Supply line 102 also defines a conduit having a first end 105 and a second end 106 and is configured to transport a gas, such as air or other oxygen-containing gas. The supply line 102 is coupled to connector 8, and during use, e.g., when connector 8 is coupled to an access port of the exhaust pipe 3, the conduit is in fluid communication with the exhaust pipe 3 at the first end 105. On the other end (second end 106), supply line 102 is in fluid communication with the output of an oxidizer gas source, shown here as a compressor 22 outputting compressed air. But it is understood that a reservoir of a pressurized oxygen-containing gas, such as air, could also be used.

Along the length of the supply line 102 are modules for controlling flow and measuring pressure within the supply line 102. In the embodiment shown, a pressure switch 16 is disposed on the downstream side of the compressor 22 and can be configured to output a signal to indicate whether the compressed air source is supplying an adequate air pressure through the conduit. A pressure regulator 17 is disposed on the downstream side of the pressure switch 16 and is configured to reduce the pressure of the air flowing from the compressor 22 to a predetermined pressure. A compressed air supply valve 18 is located on the downstream side of the pressure regulator 17 and can be configured to block or permit flow through the supply line conduit 102. A pressure sensor 19 is located downstream of the compressed air valve 18 and can be configured to measure the pressure within the supply line 102.

In some embodiments, supply lines 101, 102 can be coupled to connector 8 by way of one or more nozzles 23, which can be coupled to or integrated with the connector 8. The two supply line ends 103, 105 coupled to the connector 8 are in sufficient proximity to each other so that at least a portion of the fuel and the oxygen-containing gas can mix and combustion of the fuel can occur.

In addition to the supply lines, system 100a comprises an igniter 24 configured to generate a spark within the exhaust pipe 3 in proximity of the fuel and the oxidizer when exiting the first and second supply lines 101, 102. In an embodiment, the spark-generating portion of the igniter 24 can be coupled to the connector 8 such that the igniter 24 is downstream from nozzle 23 when connected to the exhaust system 110, i.e., closer to the particulate filter than nozzle 23 is.

Also coupled to connector 8 can be a temperature sensor 25. This sensor 25 is configured to measure the temperature, particularly in the exhaust pipe when the connector 8 is coupled to the exhaust pipe. This temperature sensor 25 is disposed relative to the nozzle 23 and igniter 24 so that the sensor can detect a temperature rise in the proximity of the fuel source and/or igniter 24, indicating whether the fuel injected into the exhaust system 110 actually combusted during an ignition cycle.

Figure 3A:
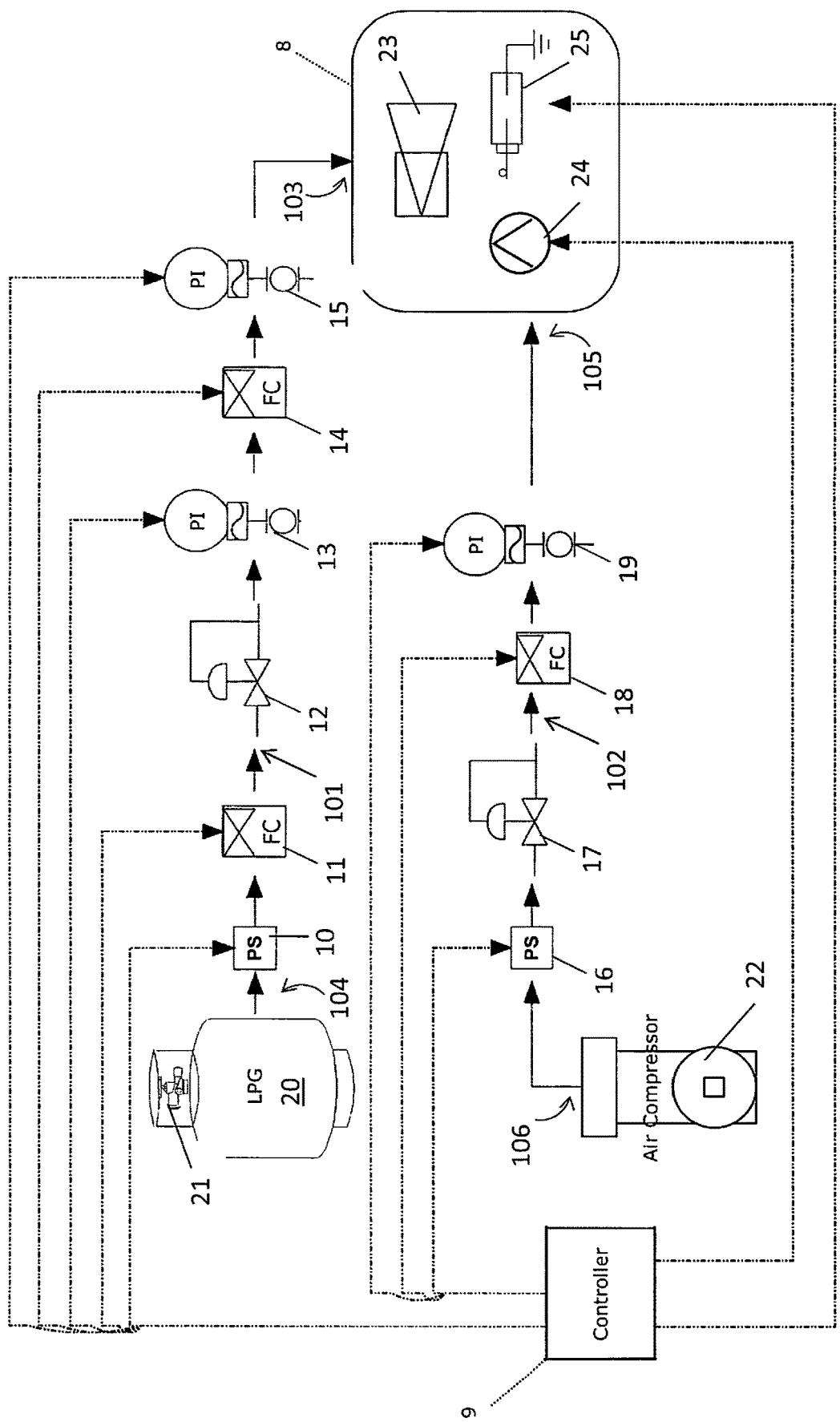
FIG. 3A is a block diagram of a regeneration system embodiment in accordance with the present disclosure.
Figure 3B:
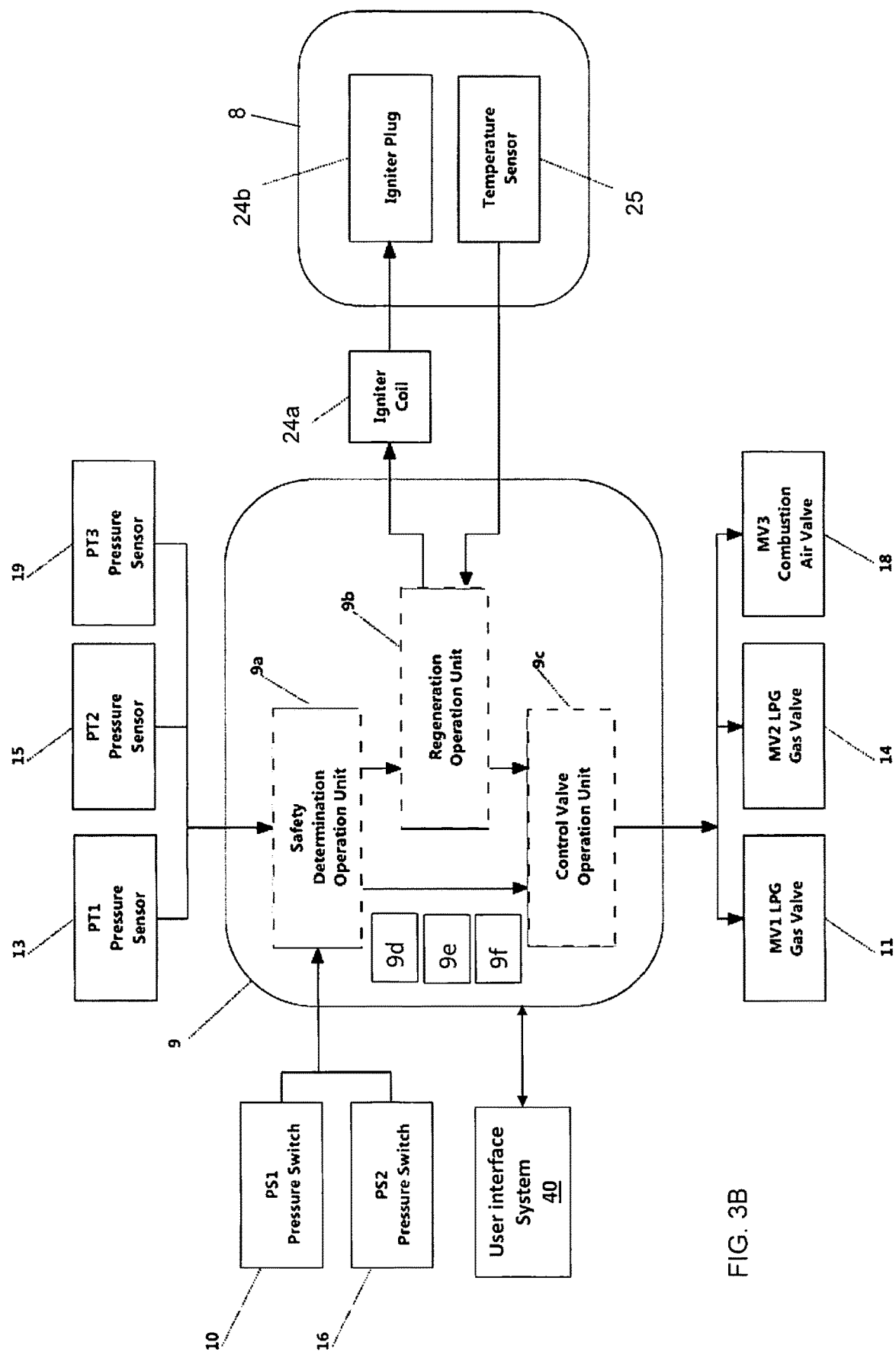
FIG. 3B is a block diagram showing the inputs and outputs of the controller of the regeneration system embodiment shown in FIG. 3A.

Referring now to FIGS. 3A and 3B, shown therein and designated by the reference numeral 100b is a second embodiment of the present regeneration system. This embodiment is similar to that shown in FIG. 2 except that it further comprises a system controller 9 and the modules of supply line 101 and 102 and those coupled to connector 8 are configured to communicate with controller 9. For example, the pressure sensors 13, 15, and 19 are configured to output a signal indicating pressure to the controller 9. Similarly, temperature sensor 25 is configured to output a signal indicating pressure to the controller 9. Valves 11, 14, 18, and/or 21 can be configured to close and open via communications from the controller 9. Controller 9 can also be configured to cycle on and off air compressor 22. The igniter 24 can be configured to actuate via communication from the controller 9. In the embodiment shown, igniter 24 comprises an ignition coil 24a and an ignition plug 24b. Ignition plug 24b (e.g., spark plug) is coupled to connector 8 and in proximity of nozzle 23. Other devices for creating the necessary heat to cause ignition of the fuel include a glow plug System controller 9 can be provided with a data-processing system comprising a microprocessor 9d configured to transmit instructions or receive readings from the various modules of the system 100b for implementation of a valve safety verification process and/or a filter regeneration process. The system 100b can further be equipped with a memory 9e, especially a non-volatile memory, allowing it to load and store a software program, that, when executed in the microprocessor 9d, allows the valve safety verification process and/or the filter regeneration process to be implemented. This non-volatile memory 9e can be, for example, a ROM (read-only memory). Furthermore, the system controller 9 comprises a memory 9f, especially a volatile memory, allowing data to be stored during the execution of the software package and the implementation of the process. This volatile memory 9f may be, for example, a RAM or EEPROM ("random access memory" or "electrically erasable programmable read-only memory", respectively).

In some embodiments, the system controller 9 can be configured to selectively and independently open and close valves (e.g., 11, 14, and/or 18)(module 9c in FIG. 3B). In some embodiments, the system controller 9 can be configured to execute a safety verification process (module 9a in FIG. 3B) and/or a regeneration process (module 9b in FIG. 3B).

Figure 4A:
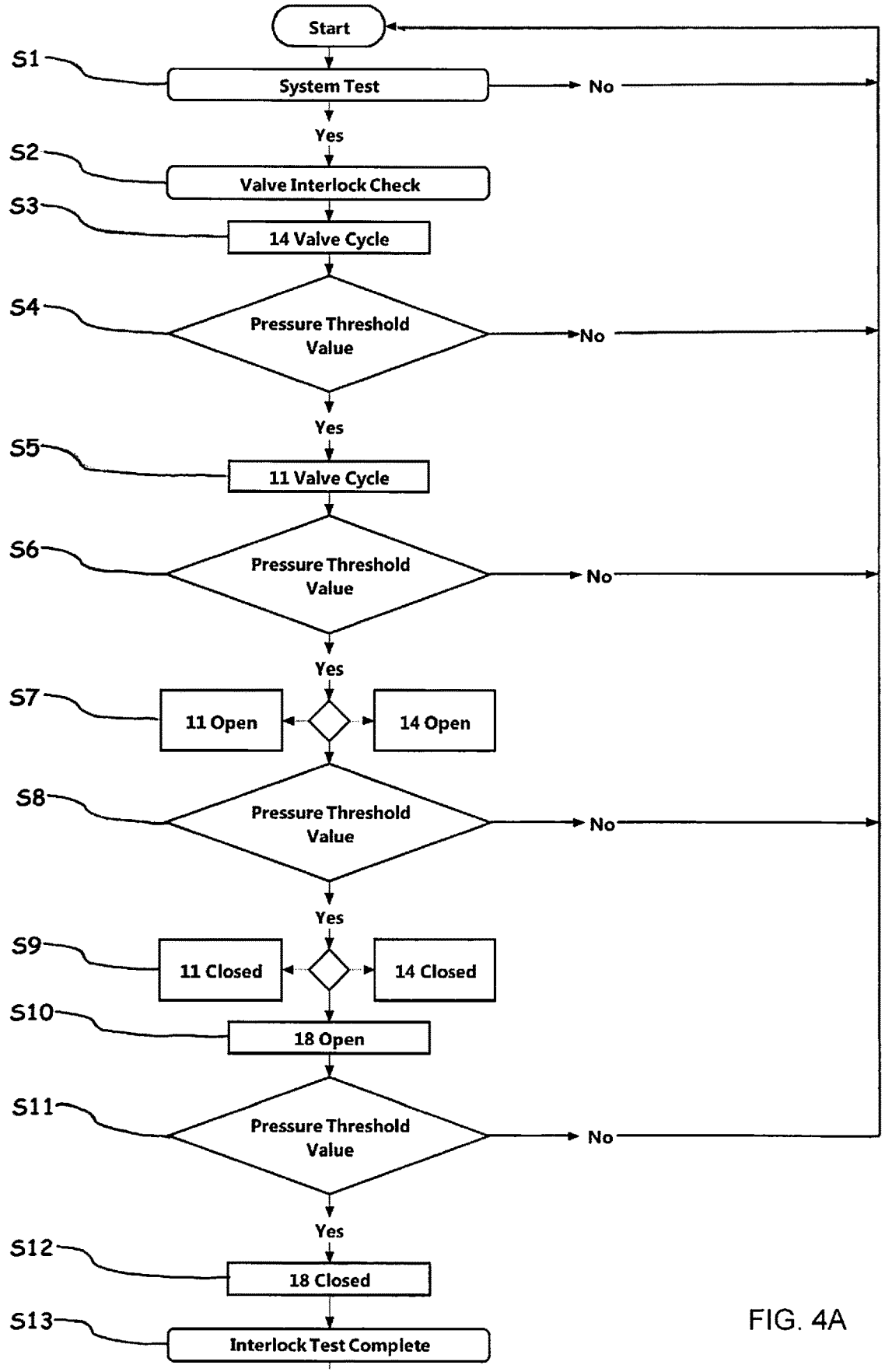
FIG. 4A is a flow chart of a valve check process.

FIG. 4A depicts an embodiment of a safety verification process with system controller 9 configured to executing one or more steps of this process. Beginning at a step S1, a sensor function verification process of all of the system's sensors will be performed. This process comprises validating pressure switches 10, 16 are above a threshold value, e.g., above 30 psi, determining if pressure sensors 13, 15, 19 are within threshold values, e.g., less than 0.5 psi, and determining if temperature sensor 25 is within a threshold value, e.g., less than 75° C. If the sensors do not relay an appropriate value, an error code with information pinpointing a failure can be generated. Such error code and/or information pinpointing the failure can be displayed on a screen, which is part of a user interface system 40.

If the sensors are verified to be operational, at a step 2, a valve interlock test is initiated to determine the integrity of the valves. Specifically, at a step S3, the fuel supply valve 14 is cycled open to relieve any pressure that may be contained between valves 11 and 14 during start up and then is cycled closed. At a step S4, a pressure reading is obtained by the pressure sensor 13 to determine if fuel supply valve 11 is leaking. For example, if the pressure rises above atmospheric, the test fails (e.g., valve 11 may be leaking) and an error code is generated. At a step S5, the fuel supply valve 11 is cycled open to pressurize the conduit of supply line 101 between fuel supply valves 11 and 14 and then is cycled closed. At a step S6, a pressure reading is obtained from pressure sensor 13 to determine if fuel valve 14 is leaking. If the pressure drops below a threshold value, the test fails. In some embodiments, this threshold value is the actual pressure of the regulator 12 or within a certain percentage thereof (e.g., 5% of the regulated pressure). If the test fails, the controller 9 can communicate with the user interface system 40, generating and displaying an error code and/or returning to a start menu.

At a step S7, the fuel supply valves 11 and 14 are both cycled open. At a step S8, a pressure reading is obtained from pressure sensors 13 and 15 to determine the integrity of the fuel pressure regulator 12 is within the threshold values. This threshold value can be the same as the previous value, e.g., the actual reservoir pressure or a minimum acceptable pressure for the reservoir. If the pressure is below or above the threshold value, the test fails and returns to the start menu with an error code.

At a step S9, the fuel supply valves 11 and 14 are cycled closed. At a step S10, the compressed air supply valve 18 is opened and the air compressor 22 is cycled on. At a step S11, a pressure reading is obtained from pressure sensor 19 to determine the integrity of the compressed air pressure regulator 17 is within a threshold value. If the pressure is below or above the threshold value, the test fails and returns to the start menu with an error code.

At a step S12, the compressed air supply valve 18 is closed and air compressor 22 is cycled off. At a step S13, if all of the above test complete without setting errors, the safety verification process is complete. In some embodiments, the system may then move on to the start of the regeneration process.

Figure 4B:
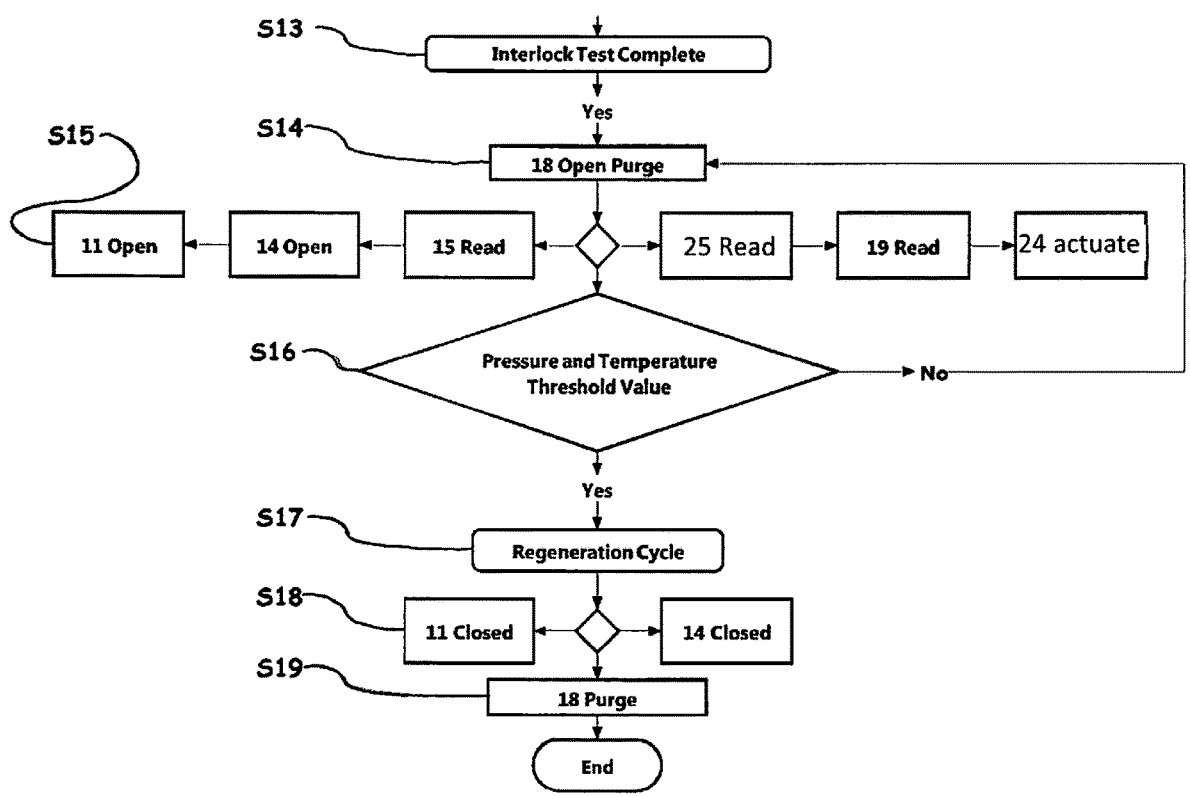
FIG. 4B is a flow chart of a filter regeneration process.

FIG. 4B depicts an embodiment of a filter regeneration process with processor 9 configured to execute one or more steps of this process. the filter regeneration process can begin at a step S14 where the compressed air valve 18 opens and the air compressor 22 is actuated to initiate the purge cycle for a predetermined amount of time (e.g., 5 seconds to 10 minutes), and the compressed air valve will remain open through step S15. At a step S15, the fuel supply valves 11 and 14 are opened. Moreover, pressure sensors 15, 19 and temperature sensor 25 will be monitored, and the igniter 24 will be actuated for a predetermined amount of time. At a step S16, a continuous measurement of the temperature sensor 25 is obtained to determine if the temperature within the exhaust pipe is above a threshold value or increased a certain amount within a set interval of time. The temperature reading helps determine combustion throughout the entire regeneration period. If temperature drops below a threshold value, the regeneration process fails and returns to the purge sequence, step S14. The system can attempt to reignite again (up to 3 times in some embodiments) before generating an error code and/or returning to the start menu. At a step S17, the regeneration process is allowed to run for a predetermined amount of time. The amount of time can depend on a number of factors that can be taken into account when determining the time, such factors can include, e.g., the vehicle make, vehicle model, vehicle year, the engine make, the engine model, the engine year, the filter type, the amount of particulates in the particulate filter, the amount of time since the filter was previously regenerated, size or mass of the filter to be regenerated; the BTUs generated by the system 100, and the moisture content in the exhaust system. In some embodiments, the regeneration process can run from 2 minutes to 3 hours or more (e.g., 2, 3, 4, 5, 10, 15, 20, 25, 30, 35, 40, 45, 50, 55, 60, 65, 70, 75, 80, 85, 90, 100, 110, 120, 130, 140, 150, 160, 170, 180 minutes, or any time therebetween). In some embodiments, the air to fuel ratio dispensed can be between 20:1 and 10:1 (e.g., 10:1, 11:1, 12:1, 13:1, 14:1, 15:1, 16:1, 17:1, 18:1, 19:1 20:1, or any range therein). System 100 can be configured to provide either a variable or constant output of BTUs. A variable BTU system would allow for comparable burn times despite differences in the filters to be cleaned. A variable system can comprise electronic regulators or electronic switching valves for regulators 12 and 17. In some embodiments, the electronic switching valves can be driven by a pulse width modulation from the controller 9, 9c. The variable BTU system could be configured to generate a higher amount of BTUs at the beginning and reduce the amount of BTUs once the filter reached a desired regeneration temperature. Such temperature can be estimated from temperature sensor 25.

To terminate the combustion cycle, at a step S18, the fuel supply valves 11 and 14 closed. At a step S19, the post purge process begins. The compressed air supply valve 18 remains open and air compressor 22 remains on for a predetermined amount of time (e.g., 5 seconds to 10 minutes), thus completing the filter regeneration process.

Figure 5:
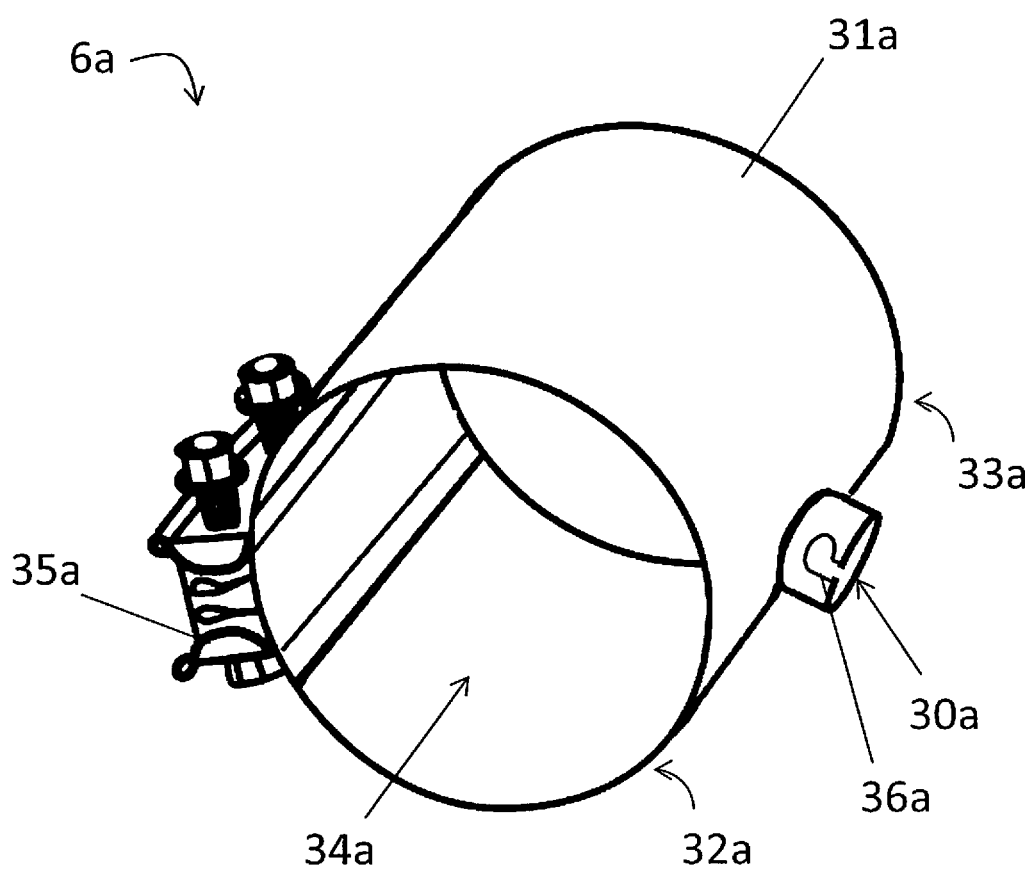
FIG. 5 is a perspective, schematic view of a clamping adapter fitting comprising an access port in accordance with an embodiment of the present disclosure.
Figure 6:
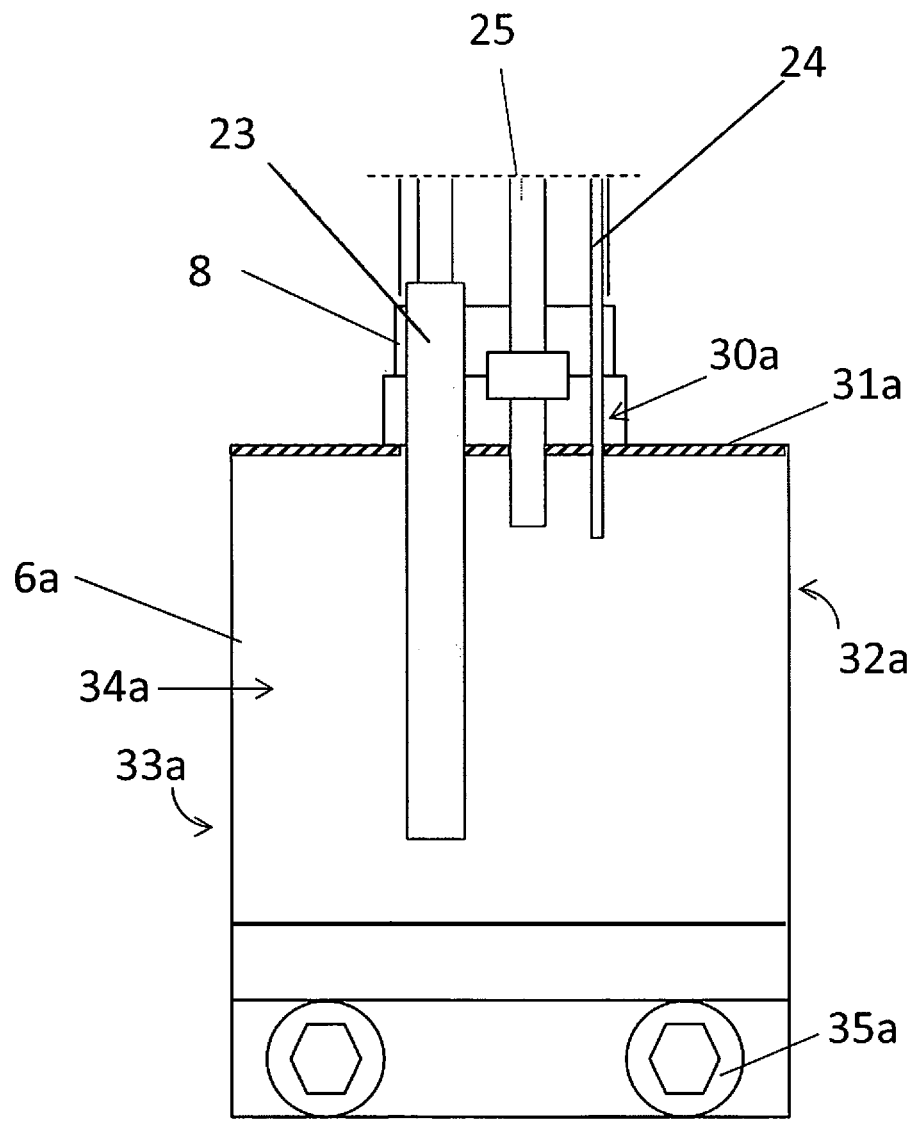
FIG. 6 is a cross-sectioned schematic of a clamping adapter fitting as shown in FIG. 5 coupled with a connector of a regeneration system embodiment, in accordance with the present disclosure.

Referring now to FIGS. 5 and 6, shown therein and designated by the reference numeral 6a is an embodiment of an adapter fitting. FIG. 5 shows a perspective view of only adapter fitting 6a, and FIG. 6 shows a cross-section schematic of adapter fitting 6a coupled to connector 8. Adapter fitting 6a is a clamp-style adapter fitting. Fitting 6a comprises a sidewall 31a having a first end 32a and a second end 33a and defining at least a portion of a conduit 34a extending between the two ends 32a, 33a. The sidewall 31a comprises an opening/access port 30a disposed between the two ends 32a, 33a that is in fluid communication with the conduit 34a. The clamp-style adapter fitting 6a is configured to clamp around an exhaust pipe (e.g., exhaust pipe 3) such that the exhaust pipe extends through the conduit 34a. The fitting 6a can comprise clamp lock 35a coupled to the sidewall 31a and configured to maintain the sidewall in a cinched/compressed position around the exhaust pipe.

In some embodiments, the adapter fitting 6a may comprise a releasable lock 36a that is adjacent to or defines at least a portion of the access port 30a. Locking mechanism 36a can be coupled to or integral with the sidewall 31a and is configured to couple with the connector 8 of filter regeneration system 100a, 110a (FIGS. 2 and 3A). Releasable locking mechanism 36a can be any variety of devices for securing two objects together, such as a screw-threaded type; bayonet-type mount, or a breech-lock type (friction type).

In some embodiments, the adapter fitting 6a can comprise a cover (not shown) rotatably or slideably coupled to the sidewall so that it can move between a closed position and an open position to selectively cover and uncover the access port. In some embodiments, the cover can be biased toward the closed position. For example, in some embodiments, the cover is coupled to the sidewall via a hinge that is biased toward the closed position.

Figure 7:
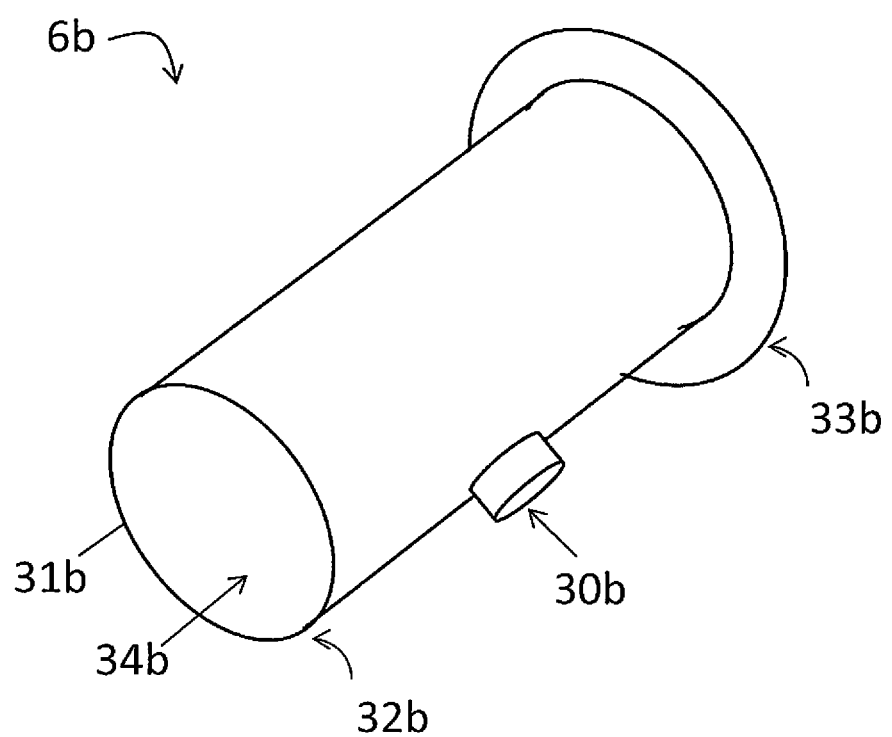
FIG. 7 is a perspective, schematic view of a flanged adapter fitting comprising an access port in accordance with an embodiment of the present disclosure.

Referring now to FIG. 7, shown therein and designated by the reference numeral 6b is another embodiment of an adapter fitting. Adapter 6b is a flanged-type adapter fitting. Adapter 6b is the same as adapter fitting 6a except the structure used to couple with exhaust pipe is a flanged end 33b and does not have a clamping mechanism or a releasable locking mechanism.

Figure 8:
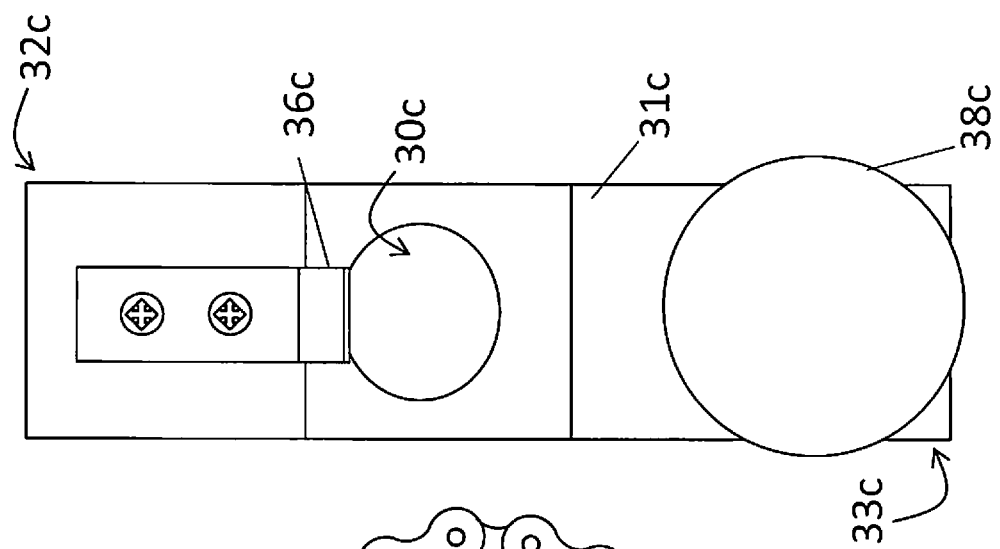
FIG. 8(*i*) is a side view of a clamping adapter fitting in accordance with an embodiment of the present disclosure.
Figure 8I:
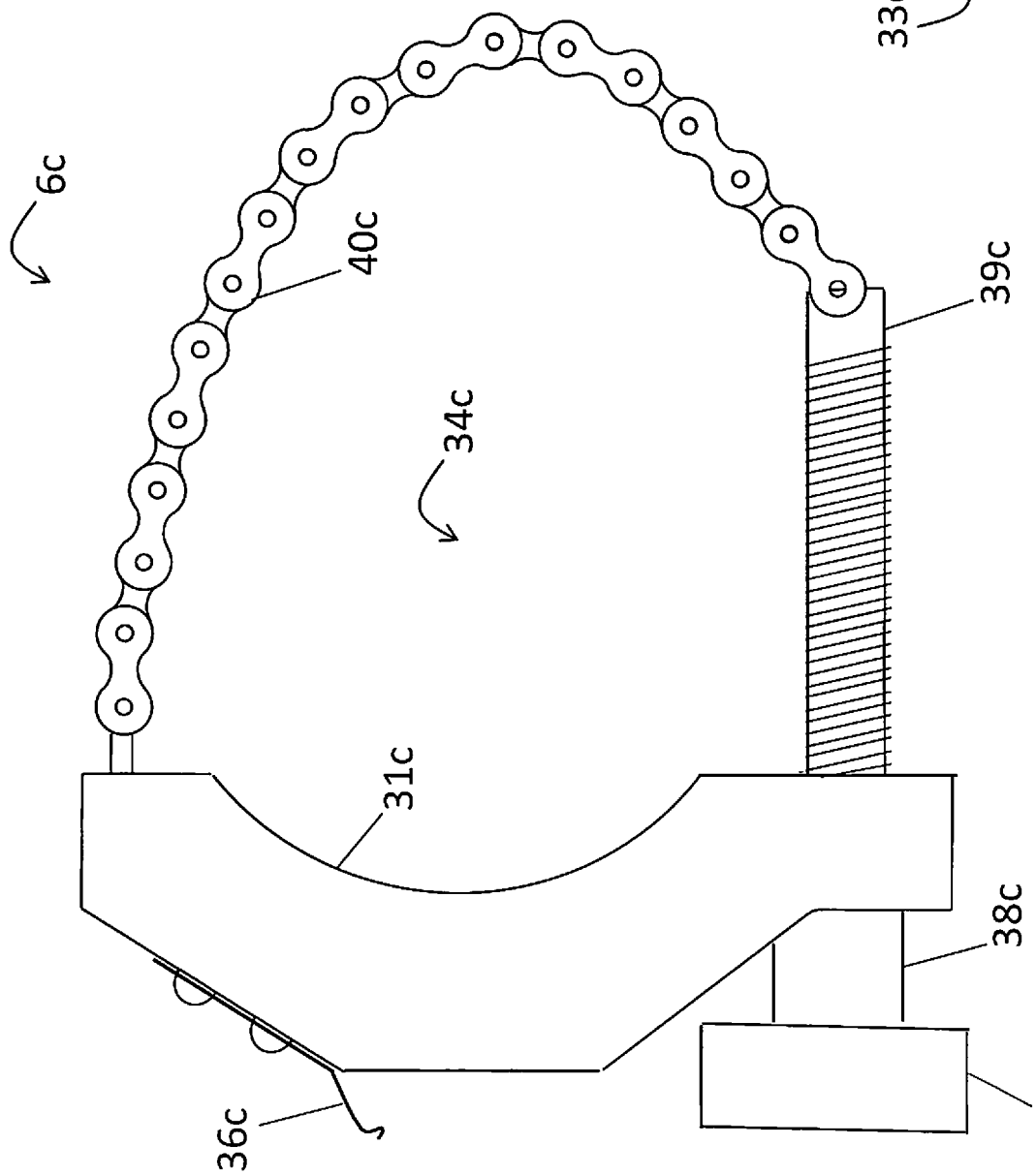

Referring now to FIG. 8, shown therein and designated by the reference numeral 6c is another embodiment of an adapter fitting. Adapter fitting 6c is a clamp-style adapter fitting similar to that shown in FIG. 5 except that a sidewall 31c defines only a portion of conduit 34c and chain 40c is coupled to sidewall 31c to define another portion of the conduit. A portion of lock 35c, namely pin 39c, also defines a portion of conduit 34c. The sidewall 31c comprises an opening/access port 30c disposed between the two ends 32c, 33c of sidewall 31c that is in fluid communication with the conduit 34c. The clamp-style adapter fitting 6c is configured to clamp around an exhaust pipe (e.g., exhaust pipe 3) such that the exhaust pipe extends through the conduit 34c. The fitting 6c can comprise clamp lock 35c coupled to the sidewall 31c and configured to maintain the sidewall 31c and chain 40c in a cinched/compressed position. In the embodiment shown, clamp lock 35c comprises a knob 38c defining a threaded receptacle configured to engage a threaded pin 39c that is coupled to chain 40c at an end opposite from where the chain is coupled to sidewall 31c.

In some embodiments, the adapter fitting 6c may comprise a releasable lock 36c that is adjacent to or defines at least a portion of the access port 30c. Lock 36c can be coupled to or integral with the sidewall 31c and is configured to couple with the connector 8 of filter regeneration system 100a, 110a (FIGS. 2 and 3A). Releasable lock 36c can be any variety of devices for securing two objects together, such as a screw-threaded type; bayonet-type mount, or a breech-lock type (friction type). In the embodiment shown, lock 36c comprises a resilient tab mounted to sidewall 31c. An end of tab 31c is disposed above opening 30c and is configured to fit into a notch of, e.g., connector 8, when the connector extends through the opening and slidably release from the notch when the connector 8 is intentionally pulled from the opening.

Some embodiments include a method of testing a particulate filter regeneration system. Referring to FIG. 2, valve 14 can be cycled opened and closed. (This cycling of valve 14 may occur after both valves 11 and 14 have been cycled open and closed.) After closing, the pressure at sensor 13 in the region between the two valves 11, 14 is compared to atmospheric pressure. If this pressure is substantially equal to atmospheric pressure, the functioning of valve 11 is verified.

To verify the function of valve 14, valve 11 is opened (while valve 14 remains closed) and the pressure between valve 11 and valve 14 is compared to a second threshold value. In some embodiments, the second threshold value is the pressure at which regulator 12 is configured to dispense the fuel in reservoir 20. If this pressure remains above or maintains a pressure substantially the same as the second threshold value, the valve 14 is verified to be functioning properly.

To verify the function of regulator 12, both valves 11, 14 are cycled open and the pressure between valves 11, 14 or after valve 14 is compared to a third threshold value. In some embodiments, the third threshold value is the pressure at which regulator 12 is configured to dispense the fuel in reservoir 20. In some embodiments, the third threshold value is equal to the second threshold value. If the difference between this pressure and the third threshold value is between 1% to 25% (e.g., 1%, 5%, 10%, 15%, 20%, or 25%), the regulator 12 is verified to be functioning properly.

To verify the function of gas pressure regulator 17, valve 18 upstream of pressure sensor 19 and downstream of air compressor 22 and regulator 17 is opened, and the pressure downstream of valve 18 (e.g., at sensor 19) is compared to a fourth threshold value. In some embodiments, the fourth threshold value is the pressure at which regulator 17 is configured to dispense the oxygen-containing gas from compressor 22. If the difference between this pressure and the fourth threshold value is between 1% to 25% (e.g., 1%, 5%, 10%, 15%, 20%, or 25%), the regulator 17 is verified to be functioning properly. (The compressor 22 is in communication with the atmosphere, which is a reservoir for the purpose of this disclosure.)

The regeneration cycle can then be initiated. In some embodiments, a particulate filter can be regenerated without removing it from the exhaust system. In other embodiments, the particulate filter can be removed from the exhaust system and placed in housing configured to contain a gaseous substance and withstand the combustion reaction. The housing is also configured to couple to connector 8.

To execute a particulate regeneration cycle, after supply lines 101, 102 are coupled to a housing containing a particulate filter or to an engine exhaust pipe at a location either upstream or downstream of a particulate filter (such as through an access port), a fuel is dispensed through supply line 101 and into the housing or the exhaust pipe, and an oxygen-containing gas is dispensed through supply line 102. The fuel (e.g., butane, propane, methane, or some combination thereof) and the oxygen-containing gas can be dispensed for a predetermined amount of time to fill the housing or exhaust system in the vicinity of the filter. After such time, the fuel can be ignited, such as by generating a spark with igniter 24 in the vicinity of dispensed fuel. This causes the fuel to combust, thereby regenerating the particulate filter. As stated previously, the fuel to gas ratio can be between 20:1 and 10:1. This combustion reaction can be maintained (e.g., by maintaining a flow of fuel and gas) for 2 minutes to 3 hours or more (e.g., 2, 3, 4, 5, 10, 15, 20, 25, 30, 35, 40, 45, 50, 55, 60, 65, 70, 75, 80, 85, 90, 100, 110, 120, 130, 140, 150, 160, 170, 180 minutes, or any time therebetween).

In order to verify that combustion has occurred, the temperature within the engine exhaust system is measured. If the temperature is above a threshold, such as 100° C., combustion is confirmed.

The above specification and examples provide a complete description of the structure and use of illustrative embodiments. Although certain embodiments have been described above with a certain degree of particularity, or with reference to one or more individual embodiments, those skilled in the art could make numerous alterations to the disclosed embodiments without departing from the scope of this invention. As such, the various illustrative embodiments of the methods and systems are not intended to be limited to the particular forms disclosed. Rather, they include all modifications and alternatives falling within the scope of the claims, and embodiments other than the one shown may include some or all of the features of the depicted embodiment. For example, elements may be omitted or combined as a unitary structure, and/or connections may be substituted. Further, where appropriate, aspects of any of the examples described above may be combined with aspects of any of the other examples described to form further examples having comparable or different properties and/or functions, and addressing the same or different problems. Similarly, it will be understood that the benefits and advantages described above may relate to one embodiment or may relate to several embodiments.

The claims are not intended to include, and should not be interpreted to include, means-plus- or step-plus-function limitations, unless such a limitation is explicitly recited in a given claim using the phrase(s) "means for" or "step for," respectively.

The invention claimed is:

1. A method of operation associated with a particulate filter regeneration system, the method comprising:
    performing a verification process of the particulate filter regeneration system, wherein performing the verification process includes:
        opening a first valve downstream of a first fuel reservoir, a fuel pressure regulator, a second valve, and a pressure sensor disposed between the first valve and the second valve, where the first valve and the second valve each define a portion of a first conduit;
        closing the first valve;
        after closing the first valve, comparing a first pressure between the first valve and the second valve to a first threshold value; and
        if the first pressure between the first valve and the second valve is less than the first threshold value, opening the second valve, closing the second valve, and comparing a second pressure between the first valve and the second valve to a second threshold value.

2. The method of claim 1, further comprising, if the second pressure is greater than or substantially equal to the second threshold value, opening the first valve and the second valve, and comparing a third pressure between the first valve and the second valve to a third threshold value.

3. The method of claim 2, further comprising, if the third pressure is within 10% of the third threshold value:
    opening a third valve positioned upstream of a third pressure sensor and downstream of a gas reservoir comprising oxygen and a gas pressure regulator configured to regulate a flow of gas from the gas reservoir; and
    comparing a fourth pressure at the third pressure sensor to a fourth threshold value,
    where the third valve defines a portion of a second conduit.

4. The method of claim 3, further comprising, if the fourth pressure is within 10% of the fourth threshold value, initiating a particulate regeneration cycle.

5. The method of claim 1, further comprising:
    coupling the particulate filter regeneration system to an exhaust pipe; and
    based on completion of the verification process, performing a particulate regeneration cycle, wherein performing the particulate regeneration cycle includes providing a combustible fuel from the first fuel reservoir through at least the first valve and the second valve and to the exhaust pipe.

6. The method of claim 5, further comprising:
    after performance of particulate regeneration cycle, decoupling the particulate filter regeneration system from the exhaust pipe; and
    wherein the particulate filter regeneration system is coupled to a portion of the exhaust pipe that includes an exhaust pipe fitting, the exhaust pipe fitting including:
        a sidewall having a first end and a second end and defining a conduit extending between the first end and the second end, where the sidewall comprises an opening disposed between the first end and the second end that is in fluid communication with the conduit; and
        a lock coupled to the sidewall and configured to releasably couple to one or more fluid supply lines when the one or more fluid supply lines are extending through the opening, and
        wherein each of the first end and the second end is configured to couple to an exhaust pipe or to a particulate filter housing such that the sidewall defines a portion of an engine exhaust path either upstream or downstream of the particulate filter housing.

7. The method of claim 6, where one of the first end and the second end is coupled to a mounting component configured to couple to a particulate filter housing.

8. The method of claim 6, where the exhaust pipe fitting further includes a cover coupled to the sidewall, moveable between an open position and a closed position, and configured to cover the opening when in the closed position.

9. The method of claim 6, where the exhaust pipe fitting further includes a clamp, an where the sidewall is a portion of the clamp.

10. The method of claim 1, further comprising:
    coupling one or more supply lines, each defining a conduit, to an exhaust pipe through at least one access port of one or more access ports disposed either upstream or downstream of a particulate filter; and
    igniting a fuel dispensed via the one or more supply lines thereby regenerating the particulate filter.

11. The method of claim 10, wherein:
    each supply line is configured to be coupled to a connector; and
    the connector is configured to be releasably coupled to the at least one access port of the one or more access ports.

12. The method of claim 10, further comprising dispensing a fuel through the one or more supply lines and into the exhaust pipe.

13. The method of claim 12, wherein:
    the fuel is a combustible fuel dispensed from the first fuel reservoir, and
    the first fuel reservoir is different than a fuel source configured to supply a second fuel to an engine.

14. The method of claim 10, wherein a connector of the particulate filter regeneration system includes the one or more supply lines, at least a portion of at least one supply line of the one or more supply lines is configured to be positioned in a flow path of the exhaust pipe while the connector is coupled to the exhaust pipe.

15. A method of operation associated with a particulate filter regeneration system, the method comprising:
performing a verification process of the particulate filter regeneration system, wherein performing the verification process includes:
opening a first valve, the first valve positioned downstream of a first fuel reservoir, a second valve, and a pressure sensor disposed between the first valve and the second valve;
based on a first pressure between the first valve and the second valve being less than or equal to a first threshold value:
adjusting the second valve; and
comparing a second pressure between the first valve and the second valve to a second threshold value.

16. The method of claim 15, further comprising:
closing the first valve;
detecting the first pressure based on the pressure sensor; and
after closing the first valve, comparing the first pressure between the first valve and the second valve to a first threshold value.

17. The method of claim 15, wherein adjusting the second valve includes:
opening the second valve; and
closing the second valve.

18. The method of claim 15, further comprising:
outputting an indication of an error based on a determination of a test failure during the verification process, and
wherein:
the first valve is positioned downstream of a fuel pressure regulator;
the first valve and the second valve each define a portion of a first conduit; or
a combination thereof.

19. The method of claim 15, further comprising:
based on completion of the verification process, performing a particulate regeneration cycle by the particulate filter regeneration system, and
wherein the verification process is a safety test of the particulate filter regeneration system performed by a controller of the particulate filter regeneration system.

* * * * *